Figure 1:
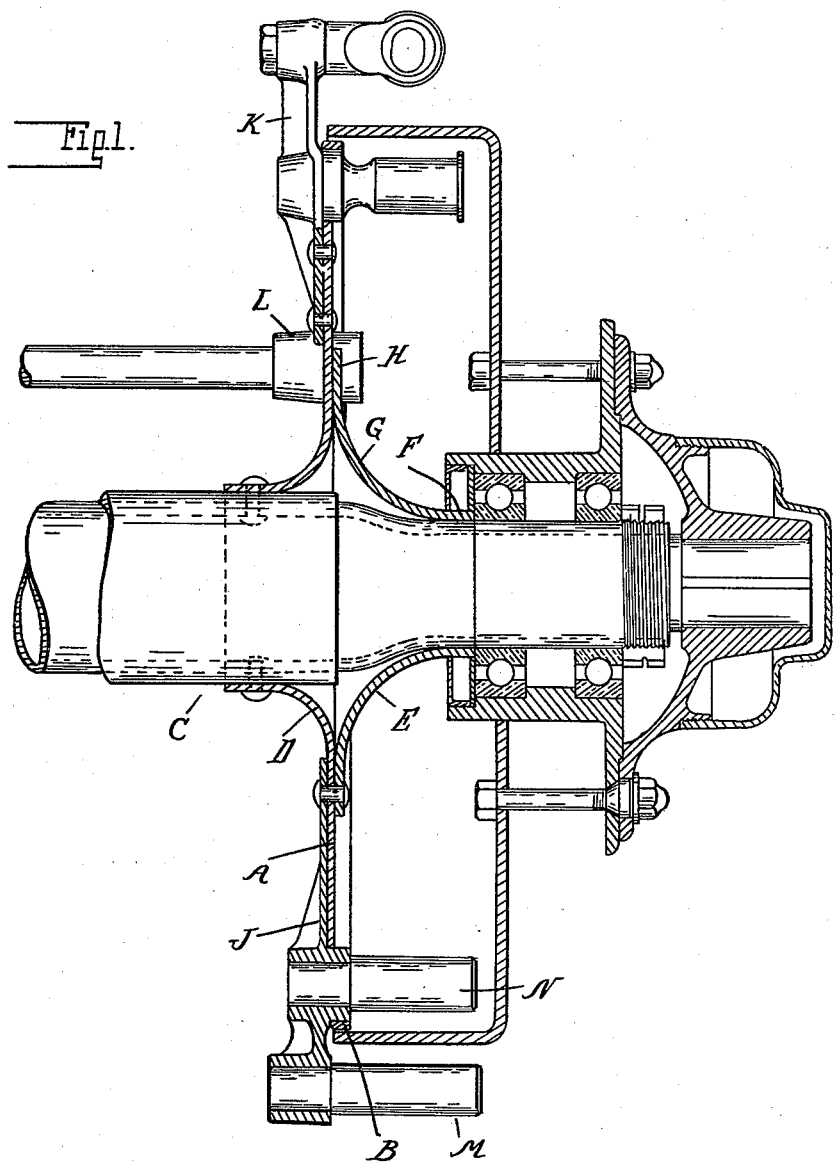

E. E. ARNOLD.
BRAKE SUPPORT FOR VEHICLE AXLES.
APPLICATION FILED MAY 4, 1912.

1,162,737.

Patented Dec. 7, 1915.
2 SHEETS—SHEET 1.

Witnesses

Inventor
Edwin E. Arnold,
By
Atty's

E. E. ARNOLD.
BRAKE SUPPORT FOR VEHICLE AXLES.
APPLICATION FILED MAY 4, 1912.
1,162,737.
Patented Dec. 7, 1915.
2 SHEETS—SHEET 2.
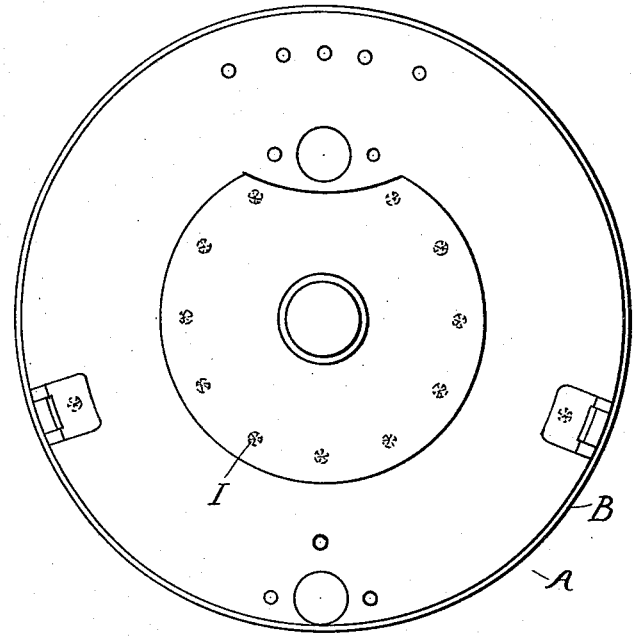
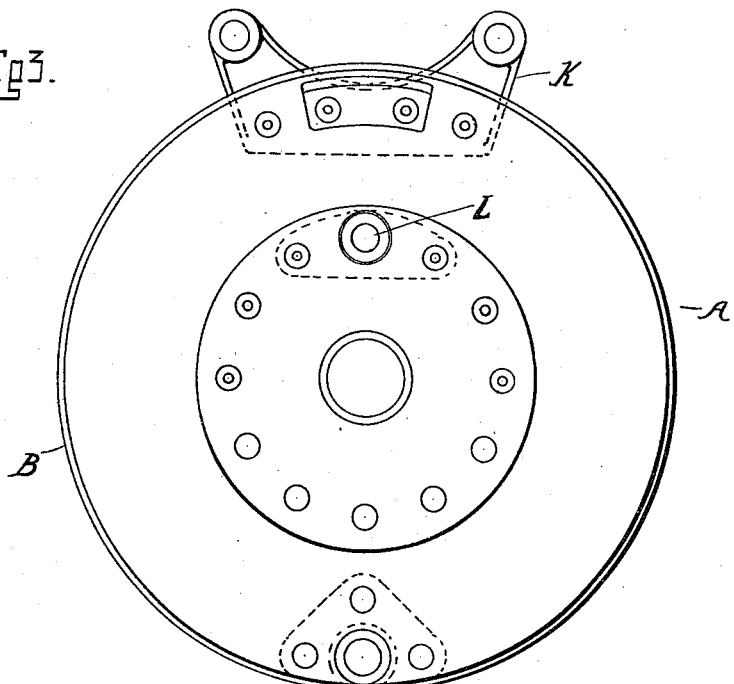
Witnesses
Inventor.
Edwin E. Arnold,
By
Atty's

UNITED STATES PATENT OFFICE.

EDWIN E. ARNOLD, OF DETROIT, MICHIGAN, ASSIGNOR TO THE TIMKEN-DETROIT AXLE COMPANY, OF DETROIT, MICHIGAN, A CORPORATION OF MICHIGAN.

BRAKE-SUPPORT FOR VEHICLE-AXLES.

1,162,737.   Specification of Letters Patent.   Patented Dec. 7, 1915.

Application filed May 4, 1912. Serial No. 695,053.

*To all whom it may concern:*

Be it known that I, EDWIN E. ARNOLD, a citizen of the United States of America, residing at Detroit, in the county of Wayne and State of Michigan, have invented certain new and useful Improvements in Brake-Supports for Vehicle-Axles, of which the following is a specification, reference being had therein to the accompanying drawings.

In the present state of the art in motor vehicle constructions it is usual to arrange brakes at opposite ends of the drive axle casing which engage brake flanges directly connected with the driving wheels. This brake mechanism usually comprising both an internal and external brake, is mounted upon a stationary head or support secured to the axle case and which usually is formed of a cast and machined member.

The object of the present invention is to simplify and cheapen the construction by substituting for this machined brake support, a main body portion formed of pressed sheet metal member or members.

A further feature of the invention is the combination with this pressed sheet metal body, the fittings formed of castings or forgings and which constitute the various bearings and fulcrums for the brake mechanism.

In the drawings,—Figure 1 is a section through my improved brake support as applied to a vehicle axle, the section being in the plane of the axis; Fig. 2 is an elevation of the body portion of the head before the fittings are attached thereto; and Fig. 3 is an elevation of the body portion showing a slightly modified form.

A is a disk-shaped member pressed from sheet metal and provided at its periphery with the turned flange B forming a strengthening and stiffening rib. At the center of this member the metal is pressed to form a cylindrical sleeve or hub C for fitting over the axle case and which emerges into the body of the disk through a rounded fillet D. E is a second member also formed from pressed sheet metal and having a sleeve portion F for fitting the contracted outer end of the axle, a rounded fillet G, and a disk portion H which is parallel to the disk portion of the member A. The member E is secured to the member A by any suitable means such as bolting or riveting, but preferably by spot welding, as indicated at I. Thus the two members A and E together form a supporting body having oppositely projecting hub portions which fit over the axle and are secured thereto by riveting or other suitable means.

To secure the brake mechanism upon the support or head member, it is necessary to provide a number of bearings or anchorages. Thus where there is both an internal and external brake, pivoted bearings must be provided for each pair of brake shoes or straps, and fulcrum bearings for the operating levers. The sheet metal has not sufficient body to permit of direct attachment of the pins thereto or to form a fulcrum bearing directly thereon. I have therefore provided a plurality of fittings J, K and L which may be formed of separate forgings or castings and which are accurately positioned on the brake head by engagement with stamped apertures therein. The fitting J carries the pins M and N forming the respective pivotal connections for the external and internal brake shoes. The fitting K forms the fulcrum member L, the external brake levers and the fitting L, a journal for the rock shaft which operates the internal brake mechanism. These fittings may be varied according to the specific construction of brake mechanism employed but in each instance they supplement the sheet metal structure by affording the necessary bearing surface and of the proper form.

With the construction as described it is obvious that the sheet metal parts being formed with dies are absolutely accurate in size and require no machining. The auxiliary fittings are all comparatively small and the cost of manufacturing the same is very slight in comparison with the cost of forming them integral with the body portion of the support.

What I claim as my invention is:

1. A brake support, comprising a pressed sheet metal disk-shaped member having a central sleeve projecting from one side thereof, a second pressed sheet-metal member forming an oppositely-extending sleeve with a portion parallel to said disk secured thereto, and auxiliary fittings mounted upon the disk portion of said member.

2. The combination with a vehicle axle, of a brake support therefor comprising a pressed sheet metal disk-shaped member having an integral sleeve for fitting the axle, and a projecting main body portion and a plurality of fittings of a size corresponding to but a segment of said disk-shaped member, said fittings being secured to adjacent segmental portions of said body portion.

3. The combination with a vehicle axle, of a brake support therefor comprising a pressed sheet metal disk-shaped member having an inner sleeve projecting from one side thereof adapted to fit the axle, and a transversely extending flange positioned at its peripheral portion, a second sheet metal member forming an oppositely extending sleeve for fitting the axle, said second member being secured to said first mentioned member, and an auxiliary fitting corresponding to but a segment of the disk-shaped portion of said member, said fitting being secured to a segmental portion of said member, and constituting a bearing for the brake mechanism.

In testimony whereof I affix my signature in presence of two witnesses.

EDWIN E. ARNOLD.

Witnesses:
JAMES P. BARRY,
DELBERT COLLINS.

Copies of this patent may be obtained for five cents each, by addressing the "Commissioner of Patents, Washington, D. C."